(12) United States Patent
Yennaco

(10) Patent No.: US 7,100,115 B1
(45) Date of Patent: Aug. 29, 2006

(54) METHOD AND APPARATUS FOR PROVIDING COMPUTER-BASED HELP

(75) Inventor: Robert A. Yennaco, Woburn, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 624 days.

(21) Appl. No.: 09/702,524

(22) Filed: Oct. 31, 2000

(51) Int. Cl.
*G06F 13/00* (2006.01)

(52) U.S. Cl. ............... 715/748; 715/733; 715/749

(58) Field of Classification Search ........... 345/705, 345/707, 708, 709, 710, 712, 714, 747, 745, 345/744, 748–749, 760, 157, 856, 859, 860, 345/862, 733, 713; 709/217, 219
See application file for complete search history.

(56) References Cited

U.S. PATENT DOCUMENTS

| | | | |
|---|---|---|---|
| 5,239,617 A * | 8/1993 | Gardner et al. ............... 706/11 |
| 5,546,521 A * | 8/1996 | Martinez .................... 345/711 |
| 5,581,684 A | 12/1996 | Dudzik et al. |
| 5,727,950 A * | 3/1998 | Cook et al. ................. 434/350 |
| 5,924,102 A | 7/1999 | Perks |
| 5,933,139 A | 8/1999 | Feigner et al. |
| 5,949,416 A * | 9/1999 | Bush ......................... 345/708 |
| 6,003,063 A * | 12/1999 | Wiley ........................ 709/108 |
| 6,101,489 A * | 8/2000 | Lannert et al. ............... 706/45 |
| 6,102,967 A * | 8/2000 | Feigner et al. .............. 717/113 |
| 6,133,917 A * | 10/2000 | Feigner et al. .............. 345/708 |
| 6,160,987 A * | 12/2000 | Ho et al. ..................... 434/350 |
| 6,209,006 B1 * | 3/2001 | Medl et al. ............... 715/501.1 |
| 6,246,404 B1 * | 6/2001 | Feigner et al. .............. 345/708 |
| 6,262,730 B1 * | 7/2001 | Horvitz et al. .............. 345/707 |
| 6,542,163 B1 * | 4/2003 | Gorbet et al. ............... 345/711 |
| 6,574,615 B1 * | 6/2003 | Huber et al. ................... 707/1 |
| 6,606,628 B1 * | 8/2003 | Monsen et al. ............. 707/100 |

\* cited by examiner

*Primary Examiner*—Cao (Kevin) Nguyen
(74) *Attorney, Agent, or Firm*—Robert C. Kowert

(57) ABSTRACT

A method of managing context-sensitive help data for a computer system includes displaying a plurality of program components to a user for interaction, and retrieving from a first memory area having a first access time first help data corresponding to a first of the components, where the first component is not interacted with by the user. Then store the first help data in a second memory area having a second access time less than the first access time. Subsequent to storing the first help data, determine whether the user has interacted with the first component, and responsive to the determination, retrieve the first help data from the second memory area and display the first help data to the user.

47 Claims, 7 Drawing Sheets

METHOD AND APPARATUS FOR PROVIDING COMPUTER-BASED HELP

FIELD OF THE INVENTION

The present invention relates generally to computers and more particularly to a method and apparatus for providing computer-based help to a user of a computer system.

BACKGROUND OF THE INVENTION

Application and system computer programs typically provide access to help. Often the help is available as a menu item in a menu bar provided by the application or systems program currently being used by the user. The user, if confused or otherwise in need of assistance, can select the menu item labeled "help", and, it is hoped, receive information that answers the computer user's question or otherwise clears up any confusion. If the help is well written and presented, it can be of considerable aid to the computer user, truly helping to boost the user's productivity and efficiency.

One approach to making help more useful to a computer user is to automatically make the help "context sensitive". Context sensitive help is tailored to the computer user's use of the application or system program. For example, any given application or systems program will typically include a variety of components which are accessible through a graphical user interface (GUI). At any given time, the computer user is typically only using a subset of those components. The user may, for example, have a particular dialog box presented on the display, which dialog box includes a variety of components that the user may select. Context sensitive help tracks the user's navigation through the program, and in response to that tracking, provides help information that relates to the particular component of the program being used at that time. Thus, when the user selects the help item from the menu bar, he or she is not simply presented with an index to the entire help database or a request to enter a search keyword for particular help. Rather, help information is presented that focuses on that aspect of the program being currently used by the user. Of course, should the user desire to search the entire help database or to view an entire index, the user can do so.

In one version of context sensitive help, the help information is automatically and constantly rendered, that is, displayed on the user's screen, typically in a separate pane that is located adjacent to a window with which the user interacts to run the application program. The contents of this separate help pane are updated as the user references various components of the graphical user interface of the application program, such as by moving a cursor over that component.

As is evident from the discussion above, help is provided to a user to boost the computer user's productivity and efficiency. The goal is to save, not waste, the user's time. Unfortunately, the effect at times can be the opposite. Computer systems are now often distributed. The Internet, a worldwide collection of networked computers, may be the best known example of a distributed computer system. Often, the computer user operates a client computer that communicates with a remote server that actually stores and runs the application program and help data. Unfortunately, due to delays in retrieving the help, such as a delay in transmitting information over networks, there can be a noticeable time lag in the rendering or retrieving of help information. The help displayed may not be relevant to the GUI component referenced. Furthermore, such delays can even interfere with the user's use of the application program, as the client computer can be occupied receiving help information over the network. In such circumstances, context sensitive help can be a nuisance and a hindrance rather than an aid. The user may even be tempted to shut off the help function completely so as to avoid the distraction of constantly loading possible irrelevant help data, and to free up system resources to avoid waiting to use the graphical user interface of the application program.

Accordingly, it is an object of the present invention to address one or more of the foregoing disadvantages and drawbacks of the prior art.

It is a further object of the present invention to provide methods and apparatus for improving the presentation of help to a computer user.

SUMMARY OF THE INVENTION

A method of managing context-sensitive help data for a computer system includes displaying a plurality of program components to a user for interaction, and retrieving from a first memory area having a first access time first help data corresponding to a first of the components, where the first component is not interacted with by the user. Then store the first help data in a second memory area having a second access time less than the first access time. Subsequent to storing the first help data, determine whether the user has interacted with the first component, and responsive to the determination, retrieve the first help data from the second memory area and display the first help data to the user.

DETAILED DESCRIPTION OF THE PREFERRED EMBODIMENTS

Figure 1:
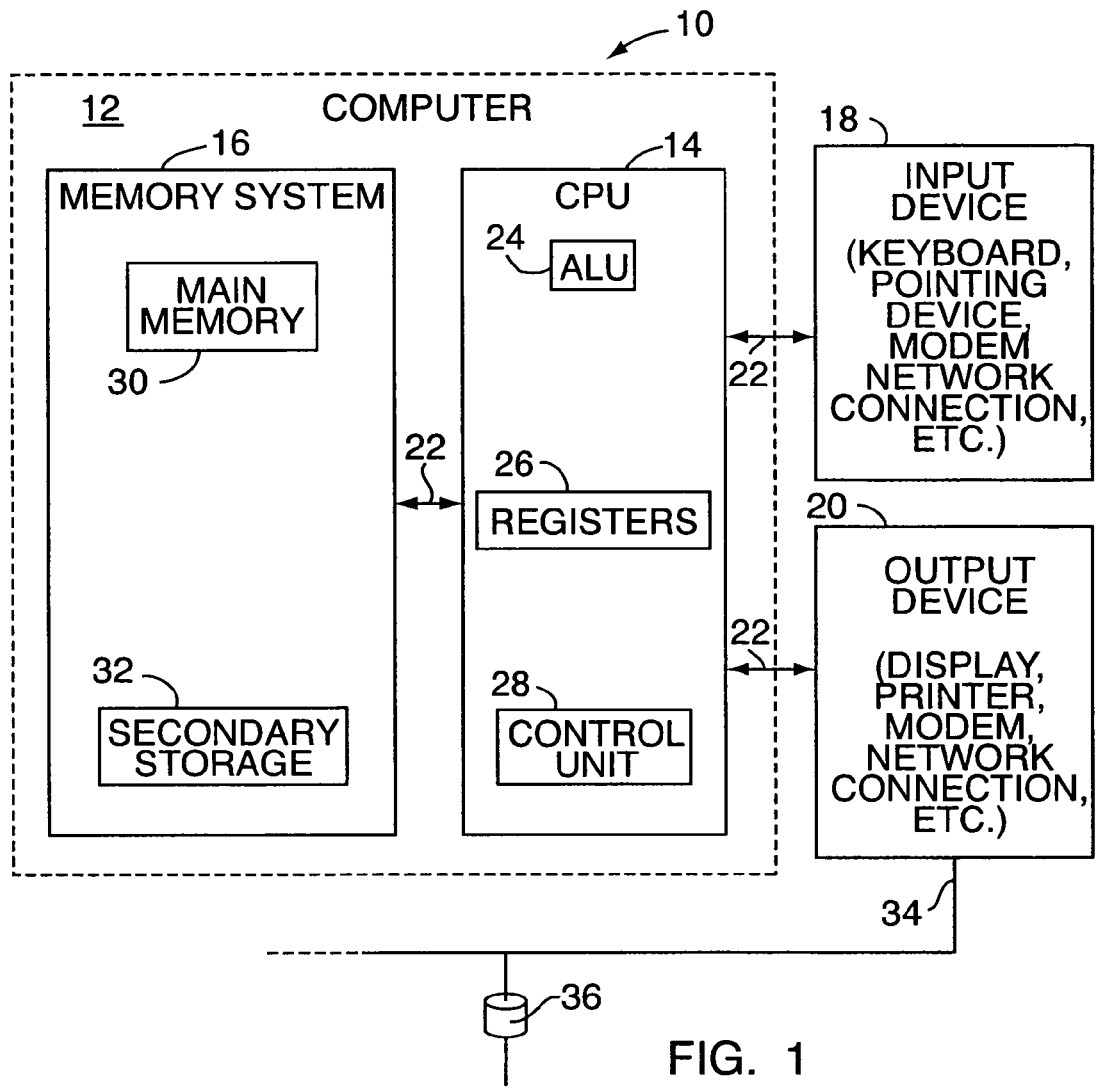
FIG. 1 is a block diagram of a computer system that can provide a suitable operating environment for practice of an embodiment of the invention.

FIG. 1 is a block diagram of a computer system 10 that provides a suitable operating environment for practice of an embodiment of the present invention. The computer system 10 includes a computer 12 that includes at least one high speed processing unit (CPU) 14, a memory system 16, an input device 18, and an output device 20. A bus structure 22 interconnects the foregoing elements. The computer system 10 can also include other computers in communication with the computer system 12, such as over a network 34, as well as remote memory 36, which is also in communication with the network 34. The network 34 can include the Internet, a Wide Area Network (WAN), a Local Area Network (LAN), and networks commonly known by those skilled in the pertinent art as intranets and extranets.

The illustrated CPU 14 can be of conventional design and can include an ALU 24 for performing computations, a collection of registers 26 for temporary storage of data and instructions, and a control unit 28 for providing control of the computer system 10. Any of a variety of processors, including those from Digital Equipment, Sun, MIPS, IBM, Motorola, NEC, Intel, Cyrix, AMD, Nexgen and others are suitable for the CPU 14. Although shown with one CPU 14, the computer system 10 may alternatively include multiple CPUs.

The memory system 16 can include a main memory 30 and a secondary storage memory 32. The main memory 30 can include high speed random access memory (RAM) and read only memory (ROM). The main memory 30 can also include any additional or alternative high speed memory device or memory circuitry. The secondary storage 32 typically takes the form of long term storage, such as ROM, optical or magnetic disks, organic memory or any other volatile or non-volatile mass storage system. Those skilled in the art will recognize that the memory system 16 can include a variety and/or combination of alternative components.

The input device 18 can include a user activated pointing device, such as a keyboard, mouse, pen and tablet, touch-screen, light pen, audio device, such as a microphone, or any other device providing input to the computer system 10. The output device 20 can include a display, a printer, an audio device, such as a speaker, or other device providing output to the computer system 10. The input/output devices 18, 20 can also include network connections, modems, or other devices used for communication with other computer systems or devices, such as communication with the remote memory 36 over the network 34.

As understood by one of ordinary skill in the art of computer programming, the present invention is described below with reference to acts and symbolic representations of operations that are performed by computer system 10, unless indicated otherwise. Such acts and operations are sometimes referred to as being computer-executed. It will be appreciated that the acts and symbolically represented operations include the manipulation by the CPU 14 of electrical signals representing data bits which causes a resulting transformation or reduction of the electrical signal representation, and the maintenance of data bits at memory locations to thereby reconfigure or otherwise alter the computer system's operation, as well as other processing of signals. The memory locations where data bits are maintained are physical locations that have particular electrical, magnetic, optical, or organic properties corresponding to the data bits. "Memory", as used herein, includes the memory system 16, the remote memory 36, or any other computer readable medium associated with the computer system 10. For example, memory can include a magnetically readable diskette or disk, or a CD ROM or any other volatile or non-volatile mass storage system. Remote memory 36 can be dedicated to the computer 12 or can be part of or interconnected with other computers. For example, remote 2' memory can be part of a server computer accessible over the network 34.

As is familiar to those skilled in the art, the computer system 10 typically includes an operating system and at least one application program. The operating system is a set of software which controls the computer system's operation and the allocation of resources. The application program is a set of software that performs a task desired by the user, making use of computer resources made available through the operating system. Both can be resident in the illustrated memory system 16.

The computer system 10 preferably uses the Solaris client/server operating system. However, other client/server operating systems (e.g. Windows NT, Windows CE, by Microsoft Corporation, OS/2, by IBM, etc.) could also be used. A client/server operating system is an operating system which is divided into multiple processes of two different types: server processes, each of which typically implements a single set of services, and client processes, which request a variety of services from the server processes. Object oriented programming is used to design the client/server operating system, and applications which run under the client/server operating system, where objects represent system resources.

For example, the Solaris client/server operating system provides shareable resources, such as files, memory, processes and threads, which are implemented as "objects" and are accessed by using "object services." As is well known in the art, an "object" is a data structure whose physical format is hidden behind an object type definition. Data structures, also referred to as records or formats, are organization schemes applied to data so that it can be interpreted, and so that specific operations can be performed on that data. Such data structures impose a physical organization on the collection of data stored within memory associated with the computer system 10 and represent specific electrical, magnetic or organic elements.

An "object type," also called an "object class," includes a data-type, services that operate on instances of the data type, and a set of object attributes. An "object attribute" is a field of data in an object that partially defines that object's state. An "object service" implements and manipulates objects, usually by reading or changing the object attributes. "Object oriented design" is a software development technique in which a system or component is expressed using objects.

An object typically has two components: a function table containing a pointer to each object member function (i.e., sometimes known as an object method) defined in the object's class, and a data block containing the current values for each object variable (i.e., data members, sometimes known as object properties). An application has some reference to an object through an object pointer. An application obtains this object reference by using some type of function call (direct or implied) in which that function allocates an object block in computer memory, initializes the function table, and returns the reference to the computer memory to an application.

The Solaris operating system allows users to execute more than one program at a time by organizing the many tasks that it must perform into "processes." The operating system allocates a portion of the computer's resources to each process and ensures that each process's program is dispatched for execution at the appropriate time and in the appropriate order.

Processes can be implemented as objects, and a computer software application executed on computer system 10 is a process. A process object typically includes the following elements: an executable program, a private address space; system resources (e.g., communication ports and files) that the operating system allocates to the process as the program executes; and at least one "thread of execution." A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

Figure 2:
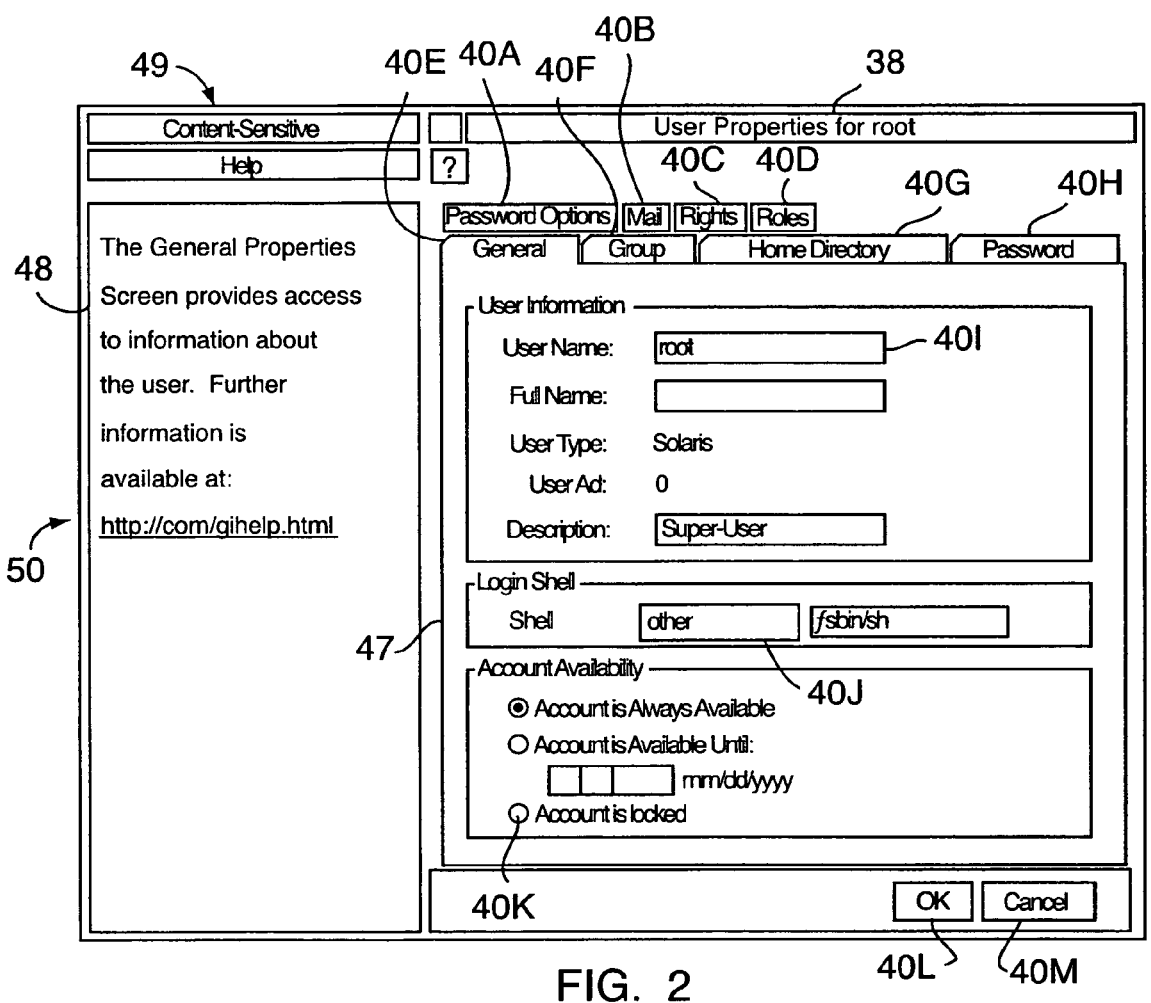
FIG. 2 shows an example of an computer display that includes program components and context-sensitive help presented in accord with an embodiment of the present invention.

In one aspect, the invention provides method and apparatus for providing context-sensitive help to a computer user. FIG. 2 shows an example of a computer display that includes program components and context-sensitive help presented in accord with an embodiment of the present invention. A computer application program running on the computer system 10 displays the dialog box 38 and includes multiple graphical control objects associated with the dialog box 38. A graphical control object is an object that displays a component, such as a button, check box or menu, to the user, and that provides information to the user and/or accepts user input.

In FIG. 2, the dialog box 38 includes several components, organized by the tabs entitled "Password Options", "Mail", "Rights", "Roles", "General", "Group", "Home Directory" and "Password". Each of the foregoing tabs is itself a component of the dialog box 38, and are indicated by reference numerals 40A–40H, respectively. The tabs are typically used to group additional components considered to be functionally related. For example, in FIG. 2 the component 40E (the tab labeled "General") is selected, which has caused a pane 47 including several additional components to be displayed. Representative of these additional components are component 40I, which is a data input field, component 40J, which is a pull down menu button, and component 40K, which is a check circle. Selecting a different tab displays a different pane that includes other components. Components that are displayed in the dialog box 38, regardless of the pane displayed, include the OK button 40L and the CANCEL button 40M.

The pane 48, which is adjacent the dialog box 38, displays context-sensitive help data 49 that relates to the component referenced by the user. The context sensitive help data displayed in the pane 48 changes as the user references different components. In FIG. 2, the user is referencing the tab labeled "General", which is the component 40E, and the help data in the pane 48 provides information about the components in the pane 47. Should the user reference a different component, such as a different tab, the help data 49 in pane 48 changes so as to be relevant to the newly referenced tab.

The user can refer to a component by operating a pointing device, such as a mouse, such that a cursor is superimposed over the component. The user can then select the component by taking additional action, such as clicking one of the buttons of the mouse. "Referring", as used herein, is deemed to include user action that indicates that the user is interacting with a particular component, and can include moving a cursor over an component as well as selecting a component. For example, when using a touch screen, the user can simply select a component directly, without first moving a cursor. In other applications, it can be required that the user actually move a cursor over a component and select the component to have the pane 48 display help data relevant to that component.

The help data 49 can also include hypertext links 50, as is well known in the art, to other sources of help data, or to another section of the same help data. While the context sensitive help data 49 is shown in FIG. 2 as text, the present invention is not so limited, as the context-sensitive help data can include other representations of help data, such as graphical, audio, tactile or audio-visual help data, without departing from the broader aspects of the present invention. Not every component shown in the dialog box 38 need have context sensitive help available.

Figure 3:
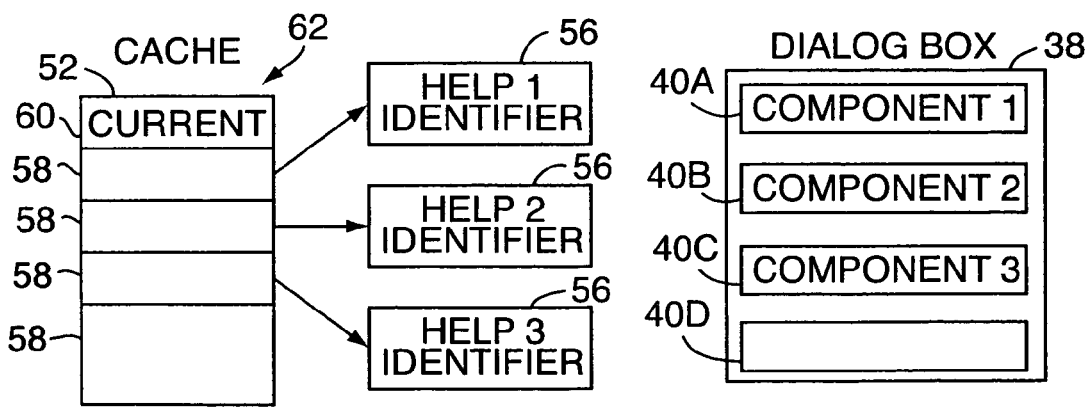
FIG. 3 is high level diagram of a data structure illustrating one aspect of the present invention.

According to the invention, help data 49 is stored in a cache memory for rendering to the user, such as in the pane 48 displayed contemporaneously with the dialog box 38. FIG. 3 is a high level diagram of a cache memory 52, and furthermore schematically illustrates the dialog box 38. The cache memory 52 is a memory storage device or area of memory area, typically within the computer 12, used to store help data temporarily and deliver that data at an access rate which is faster than the access rate of the memory storage area from which the help data was initially received. In FIG. 3, the cache 52 stores help data identifiers 56 and corresponding help data for the components 40A–D of the dialog box 38. Because space is typically limited in the cache memory 52, the cache does not typically store help data and an identifier for every component of the dialog box 38.

Figure 4:
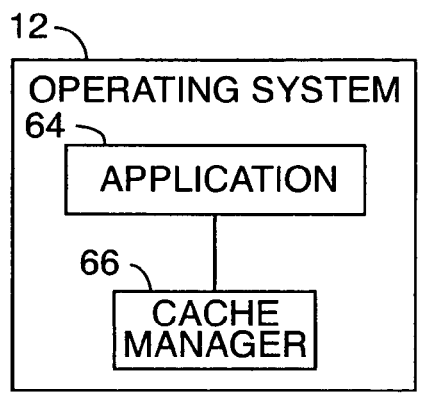
FIG. 4 is a block diagram of the computer system of FIG. 1 including an operating system, application program and cache manager.

A cache manager 66, schematically illustrated in FIG. 4, can be provided to manage the cache 52 so as to speed-up the presentation of help data to the user. As help data is retrieved, such as from the remote memory 36, and presented to the user responsive to the users referring to various components, the cache manager 66 stores the help data in the cache 52. As noted above, the cache memory is limited, and accordingly, in one practice of the invention, cache manager 66 manages the cache 52 so as to keep in the cache help data that is most likely to correspond to components that will be referenced by the user. For example, the cache manager 66 can remove the oldest help data from the cache 66 to make room for new help data. Thus, in this practice, the cache manager operates according to the assumption that the help data 49 most likely to be next requested by the user is help data which has already been requested by the user. When the user references the next component in his or her navigation through the application program, the cache manager checks that cache for the help data that corresponds to the component. If the help data 49 is in the cache, it can be rendered quickly from the cache memory 66, rather than from the remote memory 36.

Figure 5:
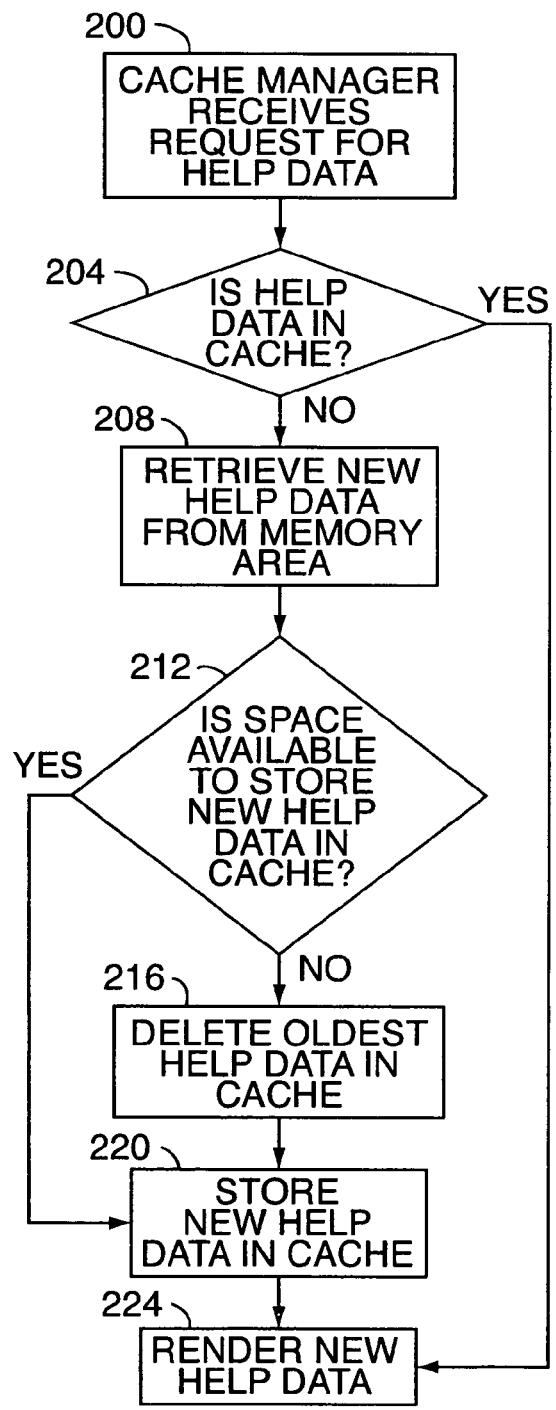
FIG. 5 is a flow diagram illustrating one method of operation of the cache manager of FIG. 4.

FIG. 5 is a flow diagram illustrating one method of operation of the cache manager of FIG. 4. Responsive to the user's referring to a component 40, the cache manager 66, as indicated by block 200, receives a request for help data. For example, the cache manager 66, preferably implemented in the Java programming language, can receive notification from an event handler, as is well known in the art, such as a Java FocusListener class (or program), along with a help data identifier 56 for the context-sensitive help data 49. The event handler, such as a FocusListener class in the Java programming language, identifies the component 40 which the user is referring to with the pointing device 18 and passes the component's help data identifier 56 to the cache manager 66.

While an event handler passing a help data identifier to a cache manager has been described, the present invention is not so limited, as any means of performing the function of notifying the cache manager that a particular component has been referenced by a user, such as setting codes identifying particular components and having the cache manager query the codes, may be implemented without departing from the broader aspects of the present invention.

Proceeding to decision block 204, the cache manager 66 determines if the identified help data is in the cache, such as by comparing the help data identifier with the contents of each of the fields 58 of the cache 52. If the help data identifier 56, and the help data 49, are found in the cache 52, the cache manager 66 provides the help data for rendering, or presenting, the help data to the user, as indicated by block 224.

If, however, the help data identifier 56 is not stored in the cache 52, the cache manager 66 retrieves the help data 49 from the location in which it is stored, as indicated by block 208, such as the secondary storage area 32, or, more likely, in the remote memory 36 shown in FIG. 1.

Proceeding to decision block 212, the cache manager 66 examines the cache 52 to determine whether there is space 158 available to store the new help data 49 in the cache. If the cache 52 does not have available space 158, in the step indicated by block 216, the cache manager 66 deletes the oldest help data and related data, such as the help data identifier 56, from the cache. Proceeding to block 220, the cache manager 66 stores the new help data 49 in the cache 52, where it is available for quick rendering if the user again refers to the component 138 corresponding to the help data. Proceeding to block 224, the help data 49 is presented to the user.

Figure 6:
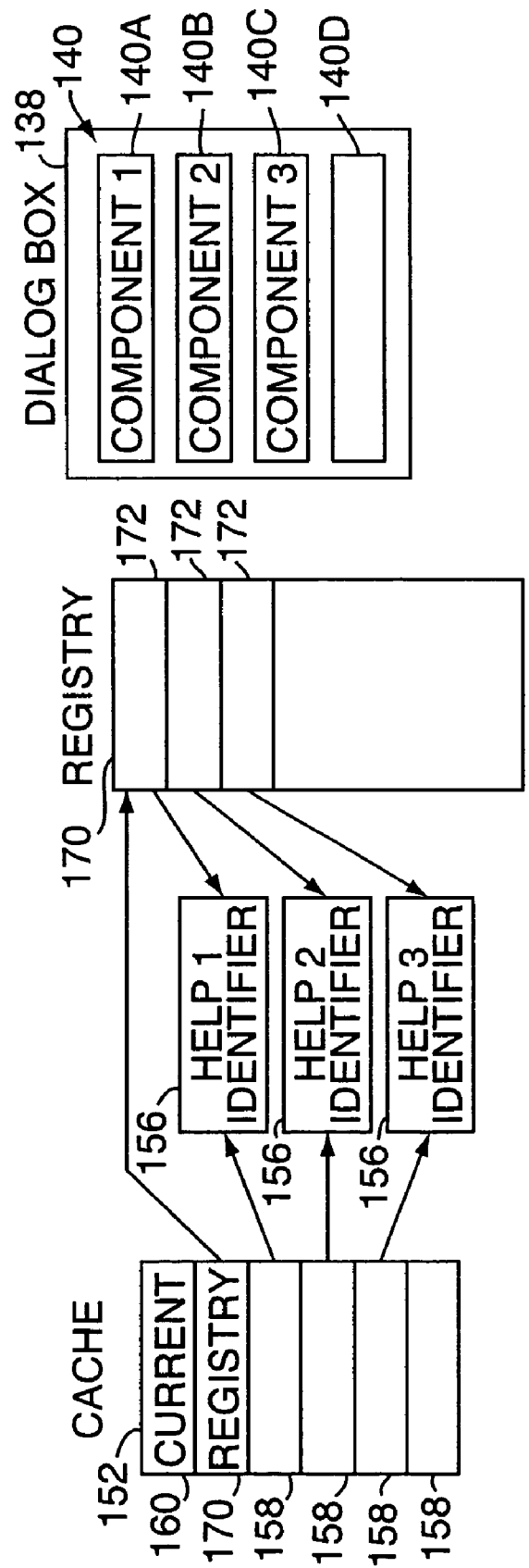
FIG. 6 is high level diagram of a data structure including a cache and registry and illustrating another aspect of the present invention.

FIG. 6 is a high level diagram of a data structure useful in another embodiment of the present invention. FIG. 6 includes a schematic illustration of the dialog box 38 including components 140A–140D, and further illustrates the cache memory 152 and the registry 170. In addition, each component 140 has a corresponding context-sensitive help data identifier 156, for accessing the component's corresponding help data 49. The cache 152 includes a designated data field 160 for storing the help data 49 which is currently being displayed. The cache 152 also includes a data field for storing the registry 170 of help data identifiers 156 which are related to each other. The registry 170 includes a list of help data identifiers 156 corresponding to components 140 that are considered to be related to each other, in that if the user refers to one of the components, it is likely that the user will also refer to one of the related components. Thus, when the help data 49 having an identifier in the registry 170 is first rendered, the help data corresponding to the other identifiers of the registry is loaded into the cache 152 from memory that has an access time that is greater than that of the cache 152, such as from remote memory 36. Thus related help data 49 can be preloaded into the cache 152, that is, loaded without the user having referred to the component 140 to which the help data pertains. The access time for retrieving help data 49 from the remote memory 36 is not just the physical speed of the data storage device containing the remote memory, but also includes time for transmitting the help data between the remote memory and CPU 14 of the computer 12. Even though the physical retrieval speed of the remote memory device 36 may require less time than the physical retrieval speed of the cache 152, the inclusion of the transmission time causes the remote memory 36 to have a slower access time than the access time of the cache 152, and thus it is advantageous to store in the cache the help data which is likely to be referenced by the user.

To speed up the presentation time of help data 49 to the user for the related components 140, when the cache manager 66 is notified of a referral by the user to one of the components, the help data for related components identified in the registry are retrieved from the data storage area, such as the remote memory 36, and stored in the cache 152. Retrieving the remaining help data 49 and storing the help data in the cache 152, or preloading, is preferably performed in a background task, or process, so as not to apparently interfere with and slow the user's computer response time. Allocating a thread of program execution so to perform tasks in a background process is well known in the art.

Figure 7A:
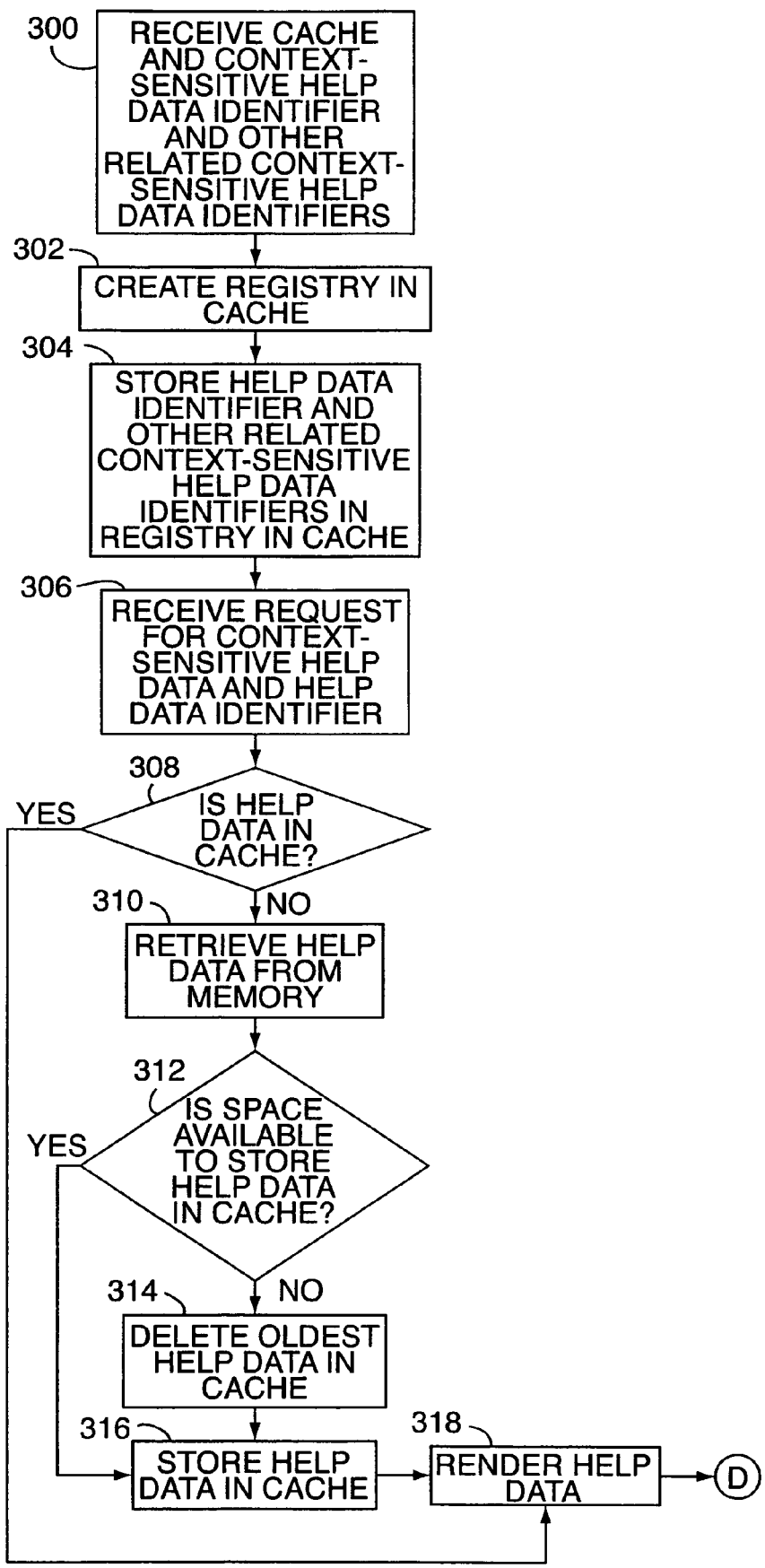
FIG. 7A is a flow diagram showing one method of operation of the computer system in accordance with the data structure of FIG. 6.
Figure 7B:
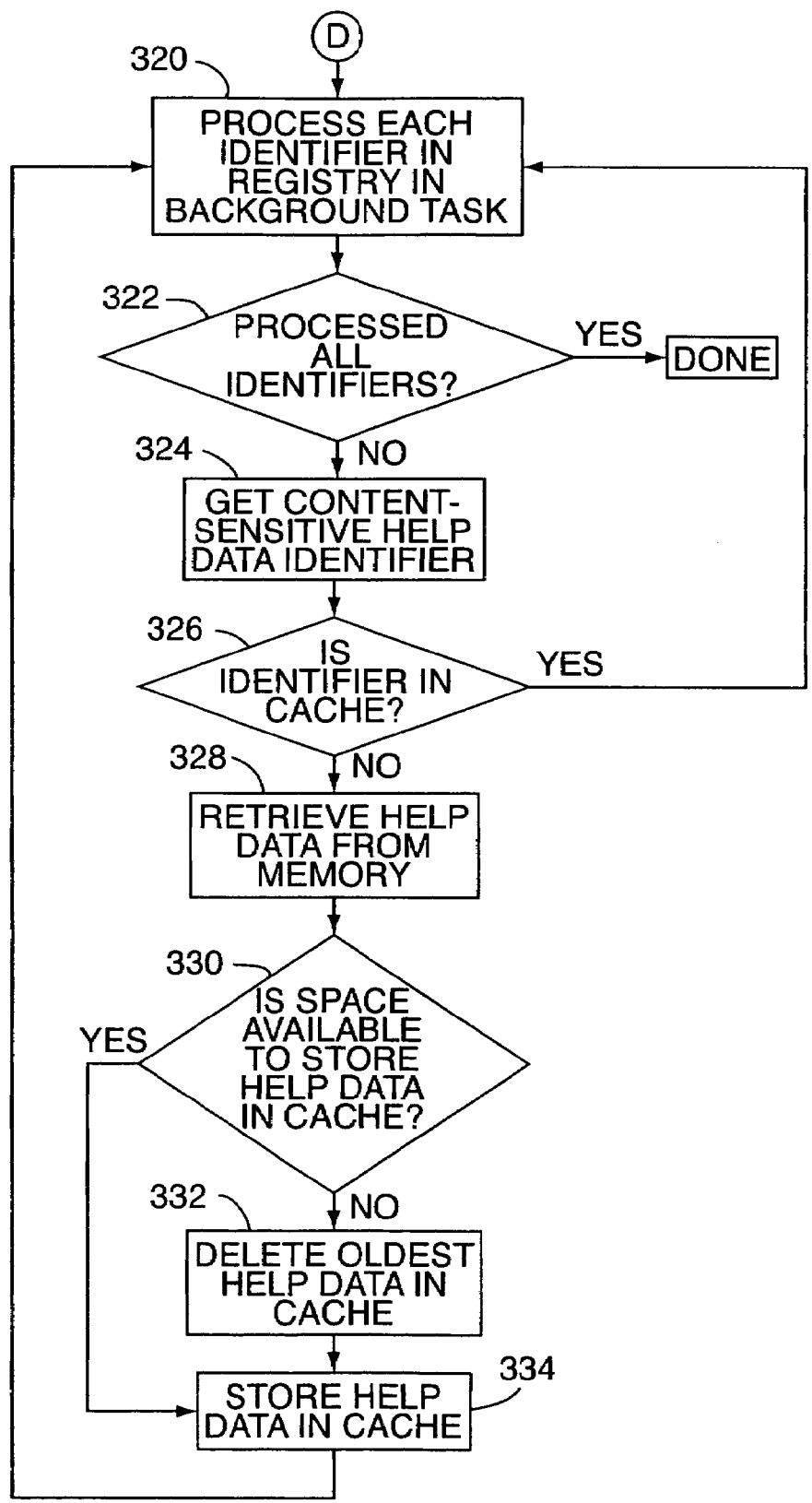
FIG. 7B is a flow diagram further illustrating operations referenced in FIG. 7A in additional detail.

FIGS. 7A and 7B are flow charts that illustrate the use of the data structure of FIG. 6 in accordance with one practice of the invention. In block 300, the cache manager 66 receives a cache 152 from a computer application 64 and also receives a plurality of help data identifiers 156 corresponding to a plurality of context-sensitive help data 49. The components 138 corresponding to the help data identifiers 156 are related to each other, such as being included in the same dialog box 138.

Proceeding to block 302, the first time the cache is referred to during registry initialization, the cache manager 66 creates the registry 170 by expanding the cache 152. Proceeding to block 304, the cache manager 66 stores the help data identifier 156 and other related context-sensitive help data identifiers in the registry in the cache. In block 306, the cache manager 66 receives a request for a context-sensitive help data 49 and receives the associated help data identifier 156 from an event handler.

Proceeding to decision block 308, the cache manager 66 examines the fields 158 in the cache 152 to determine whether the requested help data 49 corresponding to the referenced component 138 is present in the cache. If the requested help data 49 is in the cache 152, the help data is rendered, or presented, for the user. If the help data 49 has not previously been stored in the cache 152, in a step 310, the requested help data is retrieved from the data storage area 36, such as the data storage area at a remote server 36.

Continuing to block 310, the help data 49 is retrieved from the memory, such as from the secondary storage area 32 of the computer 12, or from the remote memory area 36 in communication with the computer 12 via the network 34.

Proceeding to decision block 312, the cache manager 66 examines the cache 152 to determine whether there is sufficient space 158 available to store the retrieved help data 49. If sufficient space is not available, proceeding to block 314, the oldest help data is deleted until there is sufficient space available to store the retrieved help data 49. Continuing to block 316, the retrieved help data 49 is stored in the cache 152, and in a step 318, the help data is rendered, or presented, for the user. Note that the application program or other functional means can present the help data to the user, rather than the cache manager. Such a variation is considered within the scope of the invention.

With reference to FIG. 7B, proceeding to block 320, the cache manager 66 processes each help data identifier 172 in the registry 170 to retrieve the help data associated with each help data identifier from the memory location where it is stored, such as remote memory 36.

Proceeding to decision block 322, the cache manager 66 checks if all help data identifiers 172 in the registry 170 have been processed. If all help data identifiers 172 have been processed, the cache manager 66 task is complete, and the background thread terminates. Otherwise, in block 324, the cache manager 66 gets the next content-sensitive help data identifier 172 from the registry 170, and in proceeding to decision block 326, determines whether the help data identifier is stored in the cache 152. If the help data identifier 158 is stored in the cache, the help data 49 has been already retrieved from the memory area having a slower access time, such as remote memory area 36, and stored in the cache, where the help data is quickly available for presentation to the user.

Continuing to block 328, the cache manager 66 retrieves the help data 49 corresponding to the help data identifier 172 from the memory, such as the remote memory area 36. Proceeding decision block 330, the cache manager 66 determines whether there is space 158 available to store the retrieved component help data attributes including the help data 49, the time the help data was stored and last accessed, and help data identifier 156 in the cache 152. Proceeding to block 332, if there is insufficient space 158 to store the component help data attributes, the oldest component help data attribute in the cache 152, and therefore the least likely to be referred to by the user, is deleted. The component help data attributes, including the help data 49, are stored in the cache 152, as indicated by block 334. The cache manager 66 then returns to the step 320 to begin processing the next help data identifier 172 in the registry 170.

Figure 8:
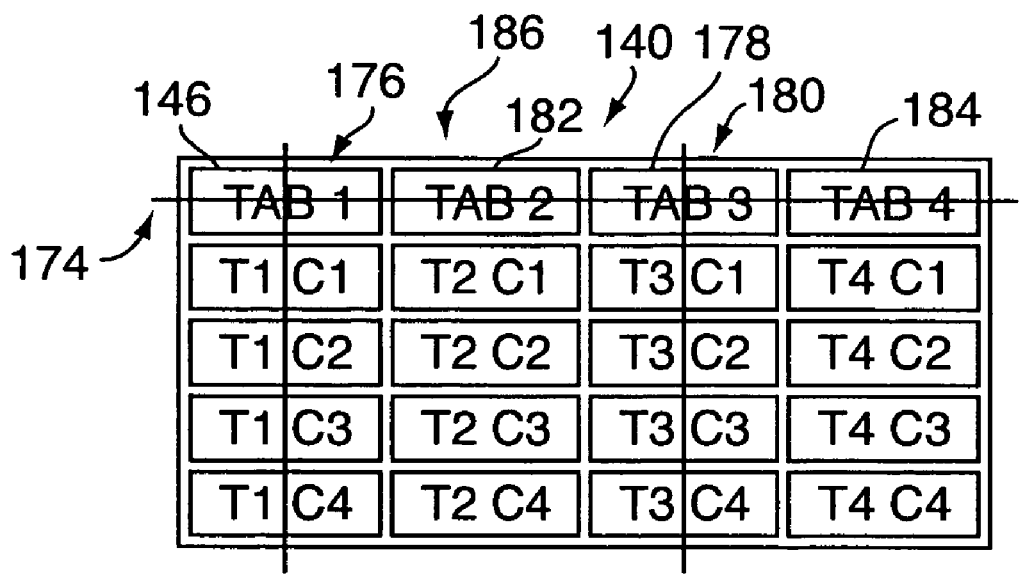
FIG. 8 schematically illustrates one implementation of the data structure of FIG. 6.

FIG. 8 schematically illustrates certain components of the dialog box 138. FIG. 2 shows a dialog box 38 including tab components 40A–40H, such as the tab component 40E labeled "General". The selection of the tab component 40E labeled "General" displays the pane 47 including a related set of components 40. The selection of another tab component, such as the tab component 40F labeled "Home Directory", displays a different pane and a different set of components 38. A user referring to the tab component 40E labeled "General" would likely also refer to some or all of the set of components 40 displayed in the displayed pane 47. Therefore, utilizing the procedure shown in FIGS. 7A and 7B, the help data 49 corresponding to the components 40 in the displayed pane 47 will be preloaded into the cache 152 as soon as the user references any one of the components in the pane, including the tab component 40E labeled "General".

Figure 9:
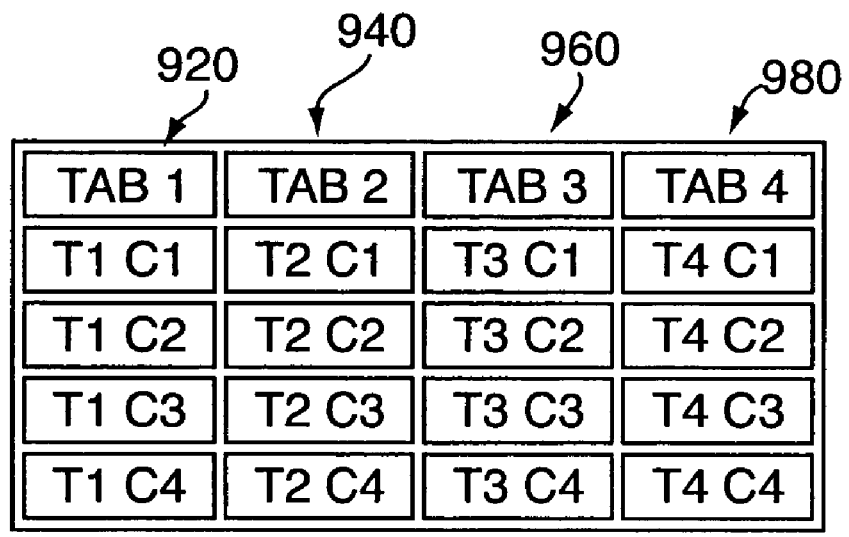
FIG. 9 is a high level diagram of a data structure including multiple cache and illustrating another aspect of the present invention.

Referring to FIGS. 2, 8 and 9, there are a plurality of caches 920, 940, 960, 980 employed to store help data for the tabbed dialog box 38, with each cache having its own registry storing related help data identifiers corresponding to related components. As noted earlier, each tab displays a different pane having different components 40, with each component having corresponding context-sensitive help. A specific cache is created for each pane. For example, the Tab 1 component 146 of FIG. 8 has a cache 920 labeled TAB1 which includes the data structure shown in FIG. 6 of a registry 170 listing the help identifiers 156 for the components 176 displayed on the Tab 1 pane. The Tab 1 component 146 of FIG. 8 represents the FIG. 2 tab component 40E labeled "General". The Tab 3 component 178 of FIG. 8 has a cache 960 labeled TAB3 which includes a different registry listing the help identifiers for the components 180 displayed on the Tab 3 pane. The Tab 3 component 178 of FIG. 8 represents the FIG. 2 tab component 40G labeled "Home Directory".

Referring to FIGS. 6, 8, and 9, when the Tab 1 component 146 is referenced by the user, the help data 49 for the related components T1C1, T1C2, T1C3, T1C4 in the column 176 under the Tab 1 component 146 are automatically preloaded into the TAB1 cache 920 by the cache manager 66, using the TAB1 cache which was provided to the cache manager by the application program 64 and the registry contained within the TAB1 cache. The help data 49 for each of the related components 140 is stored in the TAB1 cache 920. Therefore, if the user refers to any of the components 40 on the pane 47, help data can be quickly presented to the user from the TAB1 cache 920 without waiting for downloading from memory area, such as a remote memory 36.

Continuing to refer to FIGS. 2, 8 and 9, it is also likely that if the user refers to one of the tab components 174, the user also will refer to other tab components in the same dialog box 186. There is a separate cache 920, 940, 960, 980 for each tab component, with each cache including a registry. Help data 49 for the user accessible tab components 140 should be preloaded into their respective caches so that regardless of the tab component 140 to which the user refers, the help data is immediately available from one of the caches for presentation to the user. For instance, help data 49 for the Tab 3 component 178 will be preloaded into the TAB3 cache 960, while help data for a Tab 4 component 184 will be preloaded into the TAB4 cache 980. The cache manager 66 will also preload the help data 49 for the remaining tab components 174 into their respective caches, such as the help data for a Tab 2 component 182 into the TAB2 cache 940.

As an additional example, if the user refers to Tab 3 component 178, after referring to the Tab 1 component 146, the help data 49 for the Tab 3 component has already been preloaded into the TAB3 cache 960. The cache manager will search the caches 920, 940, 960, 980 for the help data corresponding to the Tab 3 component and retrieve the preloaded help data from the TAB3 cache 960. The help data 49 corresponding to the components 180, T3C1, T3C2, T3C3, T3C4, under the Tab 3 component 178 will then be preloaded into the TAB3 cache 960.

If the user selects the Tab 3 component 178, a pane and components associated with the Tab 3 components will be displayed. If the user then refers to any of the components 180 within the Tab 3 pane, the corresponding help data will be quickly presented to the user since the help data has already been preloaded into TAB3 cache 960, and will not have to be downloaded from a storage area with a slower access time.

While using the preassigned fields of a registry containing help data identifiers for related components for preloading corresponding help data has been shown and described, the present invention is not so limited, as help data for any component, or for all or selected references in a registry, may be manually preloaded by an application at any time through the use of a cache manager manual public interface, without departing from the broader aspects of the present invention. Manual preloading allows help data preloading for more complex scenarios than those shown above, such as for managing hyperlink help data.

Referring to FIG. 2, help data 49 may contain references and hyperlinks to other documents or information, such as a hypertext link 50, as is well known in the art. Help data displayed by selecting the hypertext link 50 in the help data 49 of FIG. 2 may contain additional hyperlinks to other related help data. To promote faster presentation to a user, the hyperlinked accessed help data should be managed by the cache manager 66 and preloaded into a cache 152. Of course, selecting one of the additional hyperlinks may display further embedded help data related hyperlinks which also have help data which should be preloaded into a cache, and so on. While the help data cache or caches are managed by the cache manager, a hyperlink manager tracks the use of hyperlinks to permit forward and backward navigation of the hyperlinks. The cache manager 66 may be employed by the hyperlink manager to optimize retrieval of such hyperlink help data 49 by preloading the help data for a hyperlink before the hyperlink is selected, as described above.

The hyperlink manager typically maintains a history stack, which is different than a cache, so the user can navigate forward and backward between selected hyperlinks, such as with a browser's Backward button. For example, assuming that the first component has hyperlinked help data, as described earlier, the hyperlink history stack contains hyperlinks for the first component's help data, allowing navigation back to the first component's first help data. At some point, the hyperlink history stack needs to be cleared because the user has moved from the first component to a second component. If the hyperlink history stack was not cleared, the user would navigate back to the first component's help data even after the second component, and its associated help data, was referenced.

The hyperlink history stack can be cleared by the cache manager 66 if the hyperlink manager provides a method, such as an application program interface (API) which the cache manager can access. Given such an interface, in addition to managing the cache for the hypertext help data, the cache manager 66 may clear the hyperlink history stack whenever the user changes their reference from one component to another component.

Preferably, the methods and apparatus of the present invention are implemented using an object oriented language such as JAVA. The following public interfaces were found to be of use in one such JAVA implementation, and are provided as an example for those of ordinary skill in the art of one approach to implementation of the present invention in the JAVA language.

```
/**
*Uniquely instantiate a focus listener and associate it with the
*given help file. This listener and it's help text is not automatically
*maintained in a cache, and is not optimized for performance in the
*face of file downloading. This constructor is maintained for
*compatibility with older apps that have yet been modified to apply a
*cache to their ContextHelpListeners.
*
@param toolClass Class object which has same codebase as html
*    file to be loaded. If this value is null, then
*    it is assumed that the help should be loaded from
*    the authorization or profiles area on a specific
*    server. See appPath for details.
*@param infoPanel   the info panel in which to render the help file
*@param appPath    path to app's directory containing help files,
*    relative to the toolClass pkg dir. eg., if the
*    html files are in
*    com/sun/admin/foo/client/<locale>/resources/html,
*    then appPath would be "resources/html".
*    If toolClass is null, then this should be in
*    URL format of "<server>:/<subdirectory>", where
*    <subdirectory> must be relative to /usr/lib/help
*    and must be one of the defined constants
*    AUTHORIZATIONS_HELPDIR or PROFILES_HELPDIR.
*@param helpName the full name of the HTML help file including the
*    ".html" extension
*/
public ContextHelpListener(Class toolClass, GenInfoPanel infoPanel,
    String appPath, String helpName)
**/
*Uniquely instantiate a focus listener and associate it with the given
*help file. This listener and it's help text can be associated with
*other listeners in a specified cache which allows for optimized
*performance in the face of file downloading as well as GC of the
*cache. Associating a group of ContextHelpListeners with a cache
*allows for optimizing performance in the face of file downloading as
*well as GC of the cache. This cache Vector must have an initial
*capacity of at least 2, and the cache will be ignored if it
*does not, as initial capacity=1 is essentially the same as no cache.
*
*WARNING: this is a shared cache - once any ContextHelpListener is
*instantiated with it, DO NOT do anything to modify the cache. Only
*base ContextHelpListener instances know how to manage it. Also, the
*cache must NOT be GC'd until the ContextHelpListeners are GC'd.
*
*@param cache the cache this listener and its help file is
*    associated with.
*@param toolClass Class object which has same codebase as html file
*    file to be loaded. If this value is null, then
*    it is assumed that the help should be loaded from
*    the authorization or profiles area on a specific
*    server. See appPath for details.
*@param infoPanel   the info panel in which to render the help file
*@param appPath    path to app's directory containing help files,
*    relative to the toolClass pkg dir. eg., if the
*    html files are in
*    com/sun/admin/foo/client/<locale>/resources/html,
*    then appPath would be "resources/html"
*    If toolClass is null, then this should be in
*    URL format of "<server>:/<subdirectory>", where
*    <subdirectory> must be relative to /usr/lib/help
*    and must be one of the defined constants
*    AUTHORIZATIONS_HELPDIR or PROFILES_HELPDIR.
*@param helpName the full name of the HTML help file including the
*    ".html" extension
*/
*public ContextHelpListener(Vector cache, Class toolClass,
*    GenInfoPanel infoPanel, String appPath, String helpName)
/**
* Searches the cache associated with the specified context listener,
* looking for a matching context listener. Note the test for a match
* is not the same as in the equals(ContextHelpListener)" method,
* which assumes the file has already been downloaded; that is, we do
* not compare the html text, only the path to the file. This method
* only compares listeners that are in the same cache as the specified
* listener object.
*
* The usefulness of this method is that it allows you to instantiate
* a context listener and find out if the help associated with that
* listener has already been downloaded via another listener.
*
* @param key the context listener to find a match for
* @return the context listener with matching codebase, or null
*    if no match found.
*/
public static ContextHelpListener findMatch(ContextHelpListener key)
/**
* Remove this listener from the cache manager's registry
*/
public void removeFromCache( )
/**
* Return the class object associated with this listener.
*
* @return the class object
*/
public Class getToolClass( )
/**
* Return the help cache associated with this context listener.
*
* WARNING: this is a shared cache - once any ContextHelpListener is
* instantiated with it, DO NOT do anything to modify the cache. Only
* base ContextHelpListener instances know how to manage it.
*
* @return the help cache for this listener
*/
public Vector getCache( )
/**
* Return the application's relative help path associated with this
* listener. This is the path relative to <app>/client/<locale>
* containing the html files.
*
*@return the relative path
*/
public String getAppPath( )
/**
* Render the html help associated with this context listener into
* the help pane.
*
* @param e the focus event. If this is NOT null, then the focus was
* gained due to the user navigating to the field this focus
* listener is associated with. If it IS null, then it is the
```

```
-continued

* result of the user clicking on a hypertext link.
*/
public void focusGained(FocusEvent e)
/**
* Force the download and caching of the help text associated with the
* the specified help listener. This does NOT result in the help being
* rendered, but only downloaded and cached so it is readily available for
* rendering when the component associated with the specified help
* listener acquires input focus.
*
*To obtain maximum benefit from pre-loading, clients should call
*this method in a subthread.
*
*@param 1 the help listener whose help file should be downloaded
*@Exception AdminException if the loading fails. In most cases,
* a client can simply eat the exception, as a re-load
* is attempted later when the component receives focus,
* and any error message will be rendered in the help
* pane.
*/
public static synchronized void loadHelp(ContextHelpListener 1)
    throws AdminException
/**
* Force the download and caching of the help text associated with the
* all the help listeners associated with the specified help cache.
* This does NOT result in the help being rendered, but only downloaded
* and cached so it is readily available for rendering when the component
* associated with the specified help listener acquires input focus.
*
* To obtain maximum benefit from pre-loading, the pre-loading is done
* in a subthread.
*
* @param cache the help cache containing all registered listeners
* associated with the cache
*/
public static synchronized void loadHelp(Vector cache)
/**
* Return the context listener associated with the html that is
* currently rendered.
*
* @return the current context listener
*/
public ContextHelpListener getCurrent( )
```

It should be understood that the foregoing description is only illustrative of the invention. Various alternatives and modifications can be devised by those skilled in the art without departing from the broader aspects of the present invention. For instance, as understood by one of ordinary skill in the art, in light of disclosure herein, while a method creating multiple caches has been shown and described, the steps of the disclosed method may also be accomplished with the use of a single cache and multiple registries, or a single cache and registry with each field including component help data attributes for determining the availability and status of help data for a particular dialog or application. While the above embodiment describes software modules, the software functions described can be embodied in software, hardware or firmware, and the functions can be implemented with object oriented code or procedural code. Accordingly, the present invention encompasses a number of alternatives, modifications and variants that fall within the scope of the appended claims.

What is claimed is:

1. A method, comprising:
   maintaining a cache specific to help data for one or more user interface components; and
   in response to receiving a request for help data for a newly referenced one of the components:
   if the help data for the referenced component is not in the cache, loading the help data for the referenced component into the cache; and
   supplying the help data for the referenced component for user presentation.

2. The method of claim 1, further comprising if the help data for the referenced component is in the cache, supplying the help data for the referenced component from the cache.

3. The method of claim 1, wherein said loading comprises deleting the least recently requested help data in the cache if there is not enough free space in the cache to store the help data for the referenced component.

4. The method of claim 1, wherein in further response to said receiving, loading into the cache help data for one or more non-referenced user interface components associated with the referenced component.

5. The method of claim 4, wherein said loading help data for the one or more non-referenced components is performed in a background process.

6. The method of claim 1, wherein in further response to said receiving loading into the cache additional help data indicated by one or more hyperlinks in the help data for the referenced component.

7. The method of claim 6, wherein in further response to said receiving loading into the cache further help data indicated by one or more hyperlinks in the additional help data.

8. The method of claim 6, further comprising in response to receiving a request for help data for a referenced one of the hyperlinks in the help data for the referenced component, supplying the additional help data for the referenced hyperlink.

9. The method of claim 1, wherein in further response to said receiving automatically loading help data into the cache for one or more non-referenced components associated with the referenced component based on predefined associations between the components.

10. The method of claim 1, wherein said loading comprises loading the help data into the cache from a remote source across a network.

11. The method of claim 1, wherein said receiving a request comprises receiving a notification event in response to a user changing focus in a dialog box, wherein the notification event comprises an indication of the reference component.

12. The method of claim 1, further comprising in response to receiving a preload request indicating one or more of the components, loading into the cache help data for each of the indicated components.

13. The method of claim 1, further comprising:
   loading a registry with predefined data associating one or more non-referenced user interface components with the referenced component; and
   in further response to said receiving:
      reading the predefined data from the registry; and
      loading into the cache help data for the or more non-referenced components.

14. The method of claim 1, wherein the cache is one of a plurality of maintained caches specific to help data, wherein each cache includes help data for one or more user interface components of a user interface section of a respective plurality of user interface sections.

15. A device, comprising:
   a processor: and
   a memory coupled to said processor, wherein the memory comprises program instructions configured to:
      maintain a cache specific to help data for one or more user-interface components; and
      in response to receiving a request for help data for a newly referenced one of the components:

if the help data for the referenced component is not in the cache, load the help data for the referenced component into the cache; and supply the help data for the referenced component for user presentation.

16. The device of claim 15, wherein the program instructions are further configured to supply the help data for the referenced component from the cache if the help data for the referenced component is in the cache.

17. The device of claim 15, wherein during said loading the program instructions are further configured to delete the least recently requested help data in the cache if there is not enough free space in the cache to store the help data for the referenced component.

18. The device of claim 15, wherein in further response to said receiving the program instructions are further configured to load into the cache help data for one or more non-referenced user interface components associated with the referenced component.

19. The device of claim 18, wherein the program instructions are further configured to perform said loading the help data for the one or more non-referenced components in a background process.

20. The device of claim 15, wherein in further response to said receiving the program instructions are further configured to load into the cache additional help data indicated by one or more hyperlinks in the help data for the referenced component.

21. The device of claim 20, wherein in further response to said receiving the program instructions are further configured to load into the cache further help data indicated by one or more hyperlinks in the additional help data.

22. The device of claim 20, wherein the program instructions are further configured to in response to receiving a request for help data for an indicated one of the hyperlinks, supplying the additional help data for the indicated hyperlink.

23. The device of claim 15, wherein in further response to said receiving the program instructions are further configured to automatically load help data into the cache for one or more non-referenced components associated with the referenced component based on predefined associations between the components.

24. The device of claim 15, wherein during said loading the program instructions are further configured to load the help data into the cache from a remote source across a network.

25. The device of claim 15, wherein during said receiving a request the program instructions are further configured to receive a notification event in response to a user changing focus in a dialog box, wherein the notification event comprises an indication of the reference component.

26. The device of claim 15, wherein the program instructions are further configured to in response to receiving a preload request indicating one or more of the components, load into the cache help data for each of the indicated components.

27. The device of claim 15, wherein the program instructions are further configured to:
   load a registry with predefined data associating one or more non-referenced user interface components with the referenced component; and
   in further response to said receiving:
      read the predefined data from the registry; and
      load into the cache help data for the or more non-referenced components.

28. The device of claim 15, further comprising maintaining a plurality of help caches specific to help data, wherein each help cache includes help data for one or more user interface components of a user interface section of a respective plurality of user interface sections, and wherein the cache one of the plurality of help caches.

29. A computer-accessible—readable medium, comprising program instructions configured to implement:
   maintaining a cache specific to help data for one or more user-interface components; and
   in response to receiving a request for help data for a newly referenced one of the components: if the help data for the referenced component is not in the cache, loading the help data for the referenced component into the cache; and supplying the help data for the referenced component for user presentation.

30. The computer-accessible—readable medium of claim 29, wherein the program instructions are further configured to implement, if the help data for the referenced component is in the cache, supplying the help data for the referenced component from the cache.

31. The computer-accessible—readable medium of claim 29, wherein said loading comprises deleting the least recently requested help data in the cache if there is not enough free space in the cache to store the help data for the referenced component.

32. The computer-accessible—readable medium of claim 29, wherein in further response to said receiving the program instructions are further configured to implement loading into the cache help data for one or more non-referenced user interface components associated with the referenced component.

33. The computer-accessible—readable medium of claim 32, wherein the program instructions are further configured to perform said loading help data for the non-referenced components in a background process.

34. The computer-accessible—readable medium wherein in further response to said receiving, the program instructions are further configured to implement loading into the cache additional help data indicated by one or more hyperlinks in the help data for the referenced component.

35. The computer-accessible—readable medium of claim 34, wherein in further response to said receiving, the program instructions are further configured to implement loading into the cache further help data indicated by one or more hyperlinks in the additional help data.

36. The computer-accessible—readable medium of claim 34, wherein in response to receiving a request for help data for an indicated one of the hyperlinks the program instructions are further configured to implement supplying the additional help data for the indicated hyperlink.

37. The computer-accessible—readable medium of claim 29, wherein in further response to said receiving the program instructions are further configured to implement automatically loading help data into the cache for one or more non-referenced components associated with the referenced component based on predefined associations between the components.

38. The computer-accessible—readable medium of claim 29, wherein during said loading the program instructions are further configured to implement loading the help data into the cache from a remote source across a network.

39. The computer-accessible—readable medium of claim 29, wherein said receiving a request comprises receiving a notification event in response to a user changing focus in a dialog box, wherein the notification event comprises an indication of the reference component.

40. The computer-accessible—readable medium of claim 29, wherein in response to receiving a preload request indicating one or more of the components, the program instructions are further configured to implement loading into the cache help data for each of the indicated components.

41. The computer-accessible—readable medium of claim 29, wherein the program instructions are further configured to implement:
  loading a registry with predefined data associating one or more non-referenced user interface components with the referenced component, and in further response to said receiving: reading the predefined data from the registry; and loading into the cache help data for the or more non-referenced components.

42. The computer-accessible—readable medium of claim 29, wherein the cache is one of a plurality of maintained caches specific to help data, wherein each cache includes help data for one or more user interface components of a user interface section of a respective plurality of user interface sections.

43. A system, comprising:
  means for maintaining a cache specific to help data for one or more user-interface components; and
  means for loading the help data for a referenced one of the components into the cache in response to receiving a request for help data for the referenced component, if the help data for the referenced component is not in the cache;
  means for in further response to said receiving, supplying the help data for the referenced component for user presentation.

44. The system of claim 43, further comprising means for supplying the help data for the referenced component from the cache if the help data for the referenced component is in the cache.

45. The system of claim 43, wherein said means for loading comprises means for deleting the least recently requested help data in the cache if there is not enough free space in the cache to store the help data for the referenced component.

46. The system of claim 43, further comprising means for, in further response to said receiving, loading additional help data into the cache for one or more non-referenced components associated with the referenced component.

47. The system of claim 46, wherein said means for loading additional help data comprises means for performing said loading additional help data in a background process.

* * * * *